United States Patent [19]

Skerker et al.

[11] Patent Number: 4,996,404
[45] Date of Patent: Feb. 26, 1991

[54] COOKING APPARATUS FOR ROASTING FOOD

[75] Inventors: Robert B. Skerker, Buffalo, N.Y.; William Prindle, Santa Barbara, Calif.

[73] Assignee: Robinson Knife Manufacturing Co., Inc., Springville, N.Y.

[21] Appl. No.: 493,139

[22] Filed: Mar. 13, 1990

[51] Int. Cl.$^5$ ................................ H05B 6/80
[52] U.S. Cl. .................... 219/10.55 E; 99/DIG. 14; 99/444; 99/449; 211/195
[58] Field of Search ............... 219/10.55 E, 10.55 F, 219/10.55 R; 99/451, DIG. 14, 449, 444, 448, 427; 211/195, 189

[56] References Cited

U.S. PATENT DOCUMENTS

| | | | |
|---|---|---|---|
| D. 268,075 | 3/1983 | Pomeroy, Jr. | D7/70 |
| 2,513,177 | 6/1950 | Irwin | 99/449 |
| 2,520,389 | 8/1950 | Ferris | 99/449 |
| 2,703,046 | 3/1955 | Ahlquist | 99/449 |
| 3,075,798 | 1/1963 | Smith | 99/449 |
| 3,918,588 | 11/1975 | Walser et al. | 211/49 |
| 4,027,583 | 6/1977 | Spanek et al. | 99/421 H |
| 4,029,004 | 6/1977 | Isenberg | 99/477 |
| 4,510,362 | 4/1985 | Miller | 219/10.55 E |
| 4,558,197 | 12/1985 | Wyatt | 219/10.55 E |
| 4,659,890 | 4/1987 | Viet | 219/10.55 E |
| 4,741,262 | 5/1988 | Moncrief | 99/449 |

FOREIGN PATENT DOCUMENTS 1519776 10/1974 United Kingdom .

Primary Examiner—Philip H. Leung
Attorney, Agent, or Firm—Hedman, Gibson, Costigan & Hoare

[57] ABSTRACT

An apparatus for suspending a food product, such as meats and the like while cooking comprised of two planar interlocking grids that allow for easy assembly and storage and allow for use in high heat and microwave environments.

13 Claims, 3 Drawing Sheets

COOKING APPARATUS FOR ROASTING FOOD

FIELD OF THE INVENTION

The present invention is directed to a cooking apparatus for suspending a food product while roasting to expose all surfaces of the food product to uniform heat and to allow excess oils and grease to drip off the food product into a pan below. Most specifically, the invention relates to a two-piece cooking apparatus suited for roasting meats and the like in high temperature and microwave environments.

BACKGROUND OF THE INVENTION

Roasting, in which an article of food, usually meat or poultry, is placed in an oven is an early and still popular cooking technique.

It is common for oven roasting racks to be made from wire to provide the advantages of simple and cheap manufacture and distribution. However, a wire roast rack is often cumbersome in configuration and occupies appreciable storage space. This is a particularly troublesome problem when the racks are stored in cluttered kitchen cabinets.

When roasting a food product on a wire roast rack, it is often difficult to manipulate and remove the food product from the rack. This is due to the fact that most roasted foods are highly proteinaceous and are therefore prone to stick to a hot roasting rack. For this reason, there is a need for the removal of the food product from a rack which will not cause damage to the cooked food. Further, the heat of the oven in such methods of roasting penetrates the body cavity of the meat or other food product being roasted and thus causes the object being roasted to drip excess oils and grease onto the rack and into the pan below. Many wire racks do not provide for adequate means to allow the food product to drip off excess oils and grease, thus making cleaning of the rack difficult and affecting the taste of food product.

In addition, any roast racks made of wire tend to rust after repeated use and cleaning and its metallic properties prevent it from being used in a microwave.

Recently, microwave cooking has become a popular alternative to oven cooking. Current kitchen cookware must be able to not only withstand high temperatures but also have the capacity to operate in the microwave environment. Microwave ovens have become popular kitchen appliances and it is apparent that use of microwave ovens will continue to increase. The wire roast racks are not suitable for use in microwave ovens because wire, metal and other such materials are not microwave compatible.

Cookware does exist that has been designed specifically for use in microwave environments. Such cookware usually takes the form of a tray or pan made of microwave compatible material. However, such cookware is unsuitable for the efficient roasting of meats and the like as such cookware does not uniformly cook the meat and does not provide the means necessary to allow oils and grease to drip off the food product.

Barder, British Patent No. 1,519,776, discloses a rack in the form of two wire grids having three planes. The reference device however is not microwave compatible and buffers the disadvantages known to wire racks. Its configuration also makes it difficult to store in kitchen cabinets.

It has been discovered that polyetherimides and, in particular, polyetherimide bearing the grade designation Ultem ®1000 and Ultem ®1010 are virtually unaffected by microwave radiation.

BRIEF DESCRIPTION OF THE INVENTION

It is therefore an object of the present invention to provide a cooking apparatus that is unaffected by high temperatures and microwave energy.

It is a further object of the present invention to provide a cooking apparatus that is durable and will maintain its shape.

It is a further object of the present invention to provide a cooking apparatus that is easily assembled and stored.

It is still a further object of the present invention to provide a cooking apparatus that allows for uniform heating.

Still a further object of the present invention is to provide a cooking apparatus that will allow oils, grease and fat to drip off the meat or other food product.

Still a further object of the present invention is to provide a cooking apparatus that is easy to clean and will resist rust.

Accordingly, the present invention is directed to cooking apparatus for suspending a food product while being roasted formed entirely of polyetherimide. Specifically, the cooking apparatus of the present invention is formed of two identical grids that interlock with each other to form a rack that will expose the maximum surface area of the food product for uniform cooking. Each grid is also provided with a means for allowing oils and grease to drip off the food product onto a pan below.

BRIEF DESCRIPTION OF THE DRAWING

The invention will be better understood by way of example with reference to the accompanying drawings in which.

DESCRIPTION OF THE PREFERRED EMBODIMENT

Figure 1:
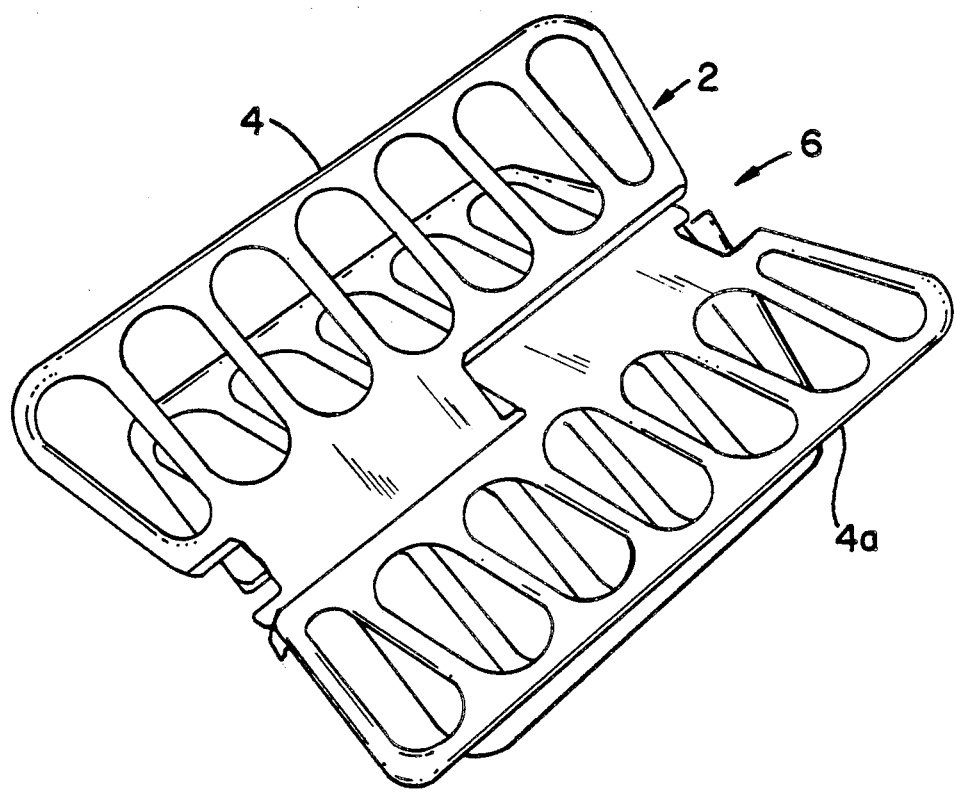
FIG. 1 is a perspective view of the cooking apparatus of the present invention.
Figure 4:
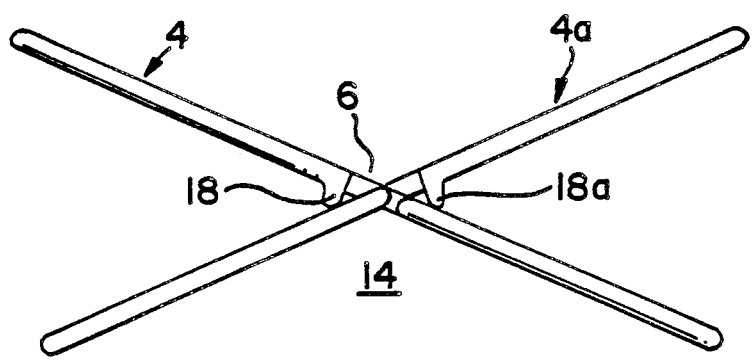
FIG. 4 is a side elevational view of FIG. 1 of the cooking apparatus of the present invention.

The cooking apparatus (2) of the present invention as seen in FIG. 1 is comprised of at least two grids (4) and (4a) and a means for reversibly interlocking each grid (4) and (4a) with each other to form a trough (6) for suspending a food product while cooking. The grids (4) and (4a) are substantially identical.

Figure 2:
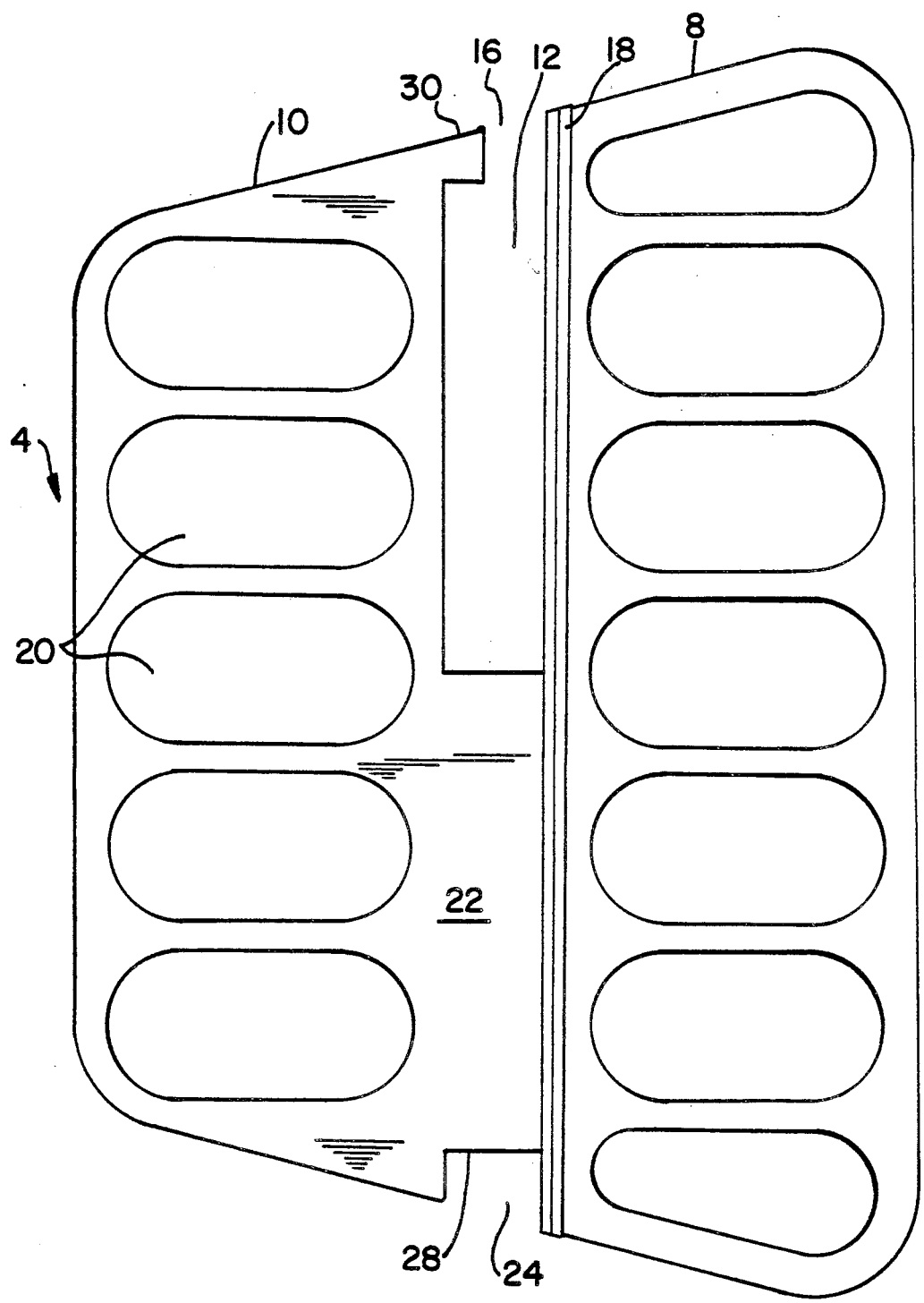
FIG. 2 is an elevational view of a grid of the cooking apparatus of the present invention.

A grid (4) as seen in FIG. 2 is substantially rectangular and planar in configuration. The grid (4) has a forward portion (8) and a rearward portion (10). The forward portion (8) and rearward portion (10) are separated by the interlocking means.

The interlocking of the grids (4) and (4a) causes the rearward portions (10) and (10a) to form a trough (6) and the forward portions (8) and (8a) of the grids (4) and (4a) to form a base (14) to support the trough (6). The forward portions (8) and (8a) diverge from the interlocking means at an angle of at least 90°.

Each grid (4) and (4a) is also provided a means for maintaining the rearward portions (10) and (10a) at an angle of diverge. The means comprise at least one projection (18) and (18a) found on the underside of each grid (4) and (4a) on the rearward portions (10) and (10a). The projections (18) and (18a) engage the upper surface of the forward portions (8) and (8a) of each grid (4) and (4a) when the grids (4) and (4a) are interlocked and maintain the angle of diverge of the rearward portions (10) and (10a).

The grid (4) is also provided with a substantially elongated slot (12), a second slot (28) and a (22). The elongated slot (12) and second slot (28) are longitudinally aligned and are of the same width. The elongated slot (12) has an open end (16) and a projection (30). The panel (22) connects the forward portion (8) and rearward portion (10) of the grid (4) and the elongated slot (12) and second slot (28). Second slot (28) also is also provided with an open end (24).

The slot (12), second slot (28) and panel (22) are means by which the grid (4) interlocks with a second grid (4a).

Figure 3:
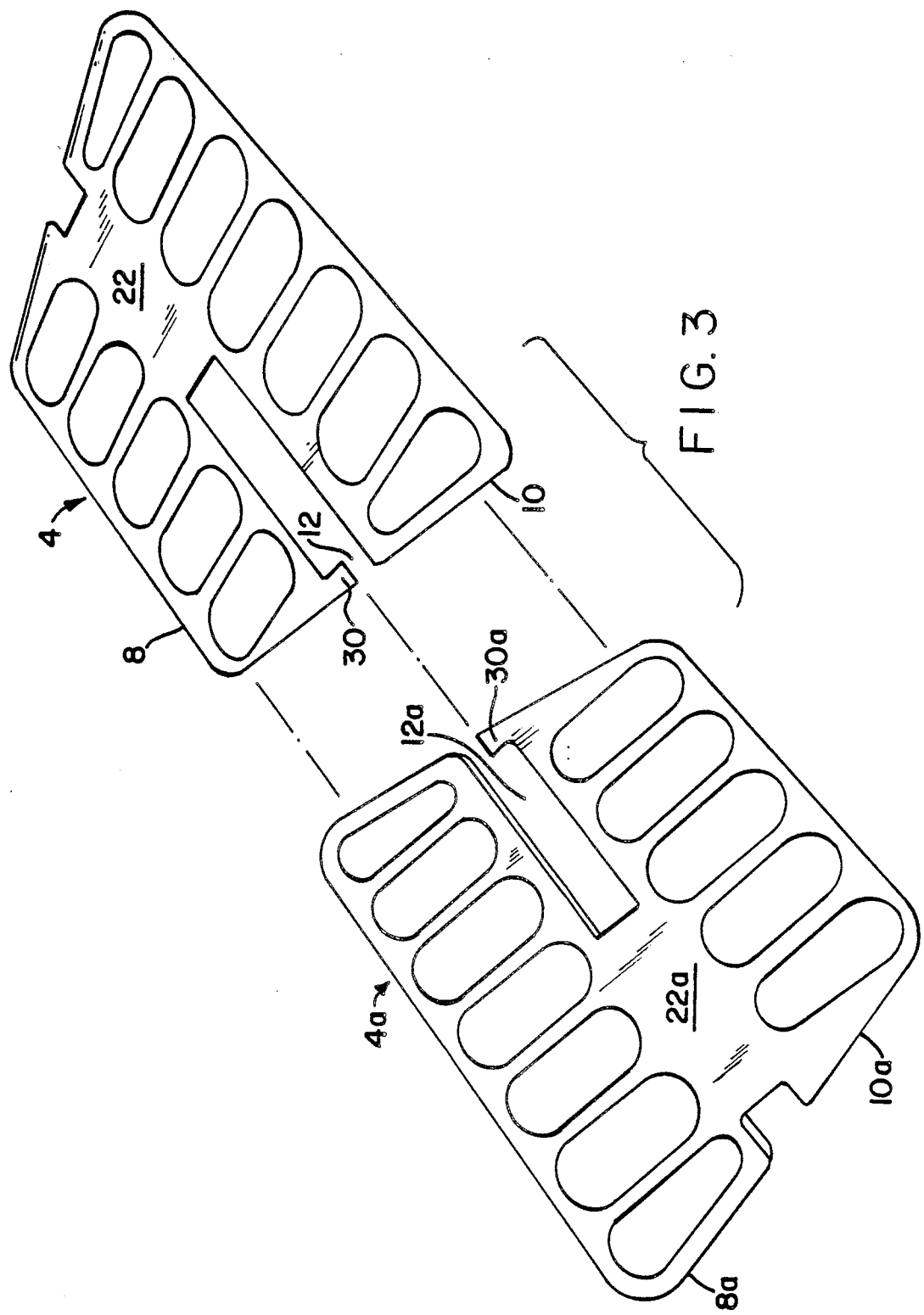
FIG. 3 is an exploded view of FIG. 1 of the cooking apparatus of the present invention.

As seen in FIG. 3, the grids (4) and (4a) are aligned so that the panel (22) of one grid (4) will longitudinally pass and be inserted through the elongated slot (12a) of a second grid (4a). The projections (30) and (30a) will prevent the panels (22) and (22a) from exiting the elongated slots (12) and (12a) after the grids (4) and (4a) have been interlocked.

The rearward portions (10) and (10a) and forward portions (8) and (8a) of each grid (4) and (4a) can be provided with a plurality of openings (20). These openings (20) are substantially elliptical in shape and allow for any oils, grease and fat to drip off the food product being roasted onto a pan below.

Each grid (4) and (4a) is integrally formed in one piece and is made of a microwave compatible material. The preferred material used to form the apparatus (2) is a polyetherimide identified at present by the trademark Ultem®1010. Practice has also taught that Ultem®1000 is another acceptable polyetherimide for use in forming the grids of the present invention. The preferred method of manufacture of the apparatus (2) is conventional injection molding.

It has been found that the necessary structural characteristics for the apparatus (2) is achieved when the length of each grid is between about 5½ to 7½ and the width of each grid is about 5". The preferred length of the elongated slot is about 3⅜ in length and ⅜" in width. The preferred dimension of the second slot is about ½" long and ⅜" wide.

I claim:

1. An apparatus for suspending a food product while cooking comprising at least two substantially planar grids and means for reversibly interlocking said grids together so as to form a trough for suspending the food product wherein each of the grids comprises a forward portion and a rearward portion, said portions being separated by said interlocking means, wherein when the grids are interlocked the rearward portions form the trough and the forward portions form a base supporting the trough.

2. The apparatus of claim 1 wherein when the grids are interlocked, the forward portions diverge from the interlocking means at an angle of about 90°.

3. The apparatus of claim 1 further comprising means for maintaining the rearward portions at an angle of diversion.

4. The apparatus of claim 3 wherein the means for maintaining the angle of diversion comprises at least one projection on the underside of the rearward portion of the grid which is adapted to engage the upper surface of the forward portion of each grid when the rearward portions are at the angle of diversion.

5. The apparatus of claim 1 wherein the interlocking means comprises an elongated slot having an open end, said slot terminating at a panel which connects the forward and rearward portions, wherein the panel of one grid is adapted to be inserted into the elongated slot of the second grid and rotated into the rearward portions from the trough.

6. The apparatus of claim 5 wherein the interlocking means further comprises a second slot having an open end separated from the elongated slot by said panel, wherein said elongated slot further comprises a projection adapted to prevent the panels from exiting the elongated slots when the grids have been interlocked.

7. The apparatus of claim 6, wherein the elongated slot and second slot are longitudinally aligned and are of the same width.

8. The apparatus of claim 1 wherein at least one of the forward and rearward portions has a plurality of openings for allowing the transmission of heat and the escape of cooking liquids from the food product.

9. The apparatus of claim 6, wherein the openings are substantially elliptical in shape.

10. The apparatus of claim 1 wherein the grids are made of a microwave compatible material.

11. The apparatus of claim 10, wherein the microwave compatible material is polyetherimide.

12. The apparatus of claim 1 wherein the two grids have a substantially identical configuration.

13. An apparatus as in claim 1, wherein the length of the grid is between about 5½" to 7½" and the width of the grid is about 5".

* * * * *